W. Britton,
Plow.
No. 113,733.   Patented Apr. 18, 1871.
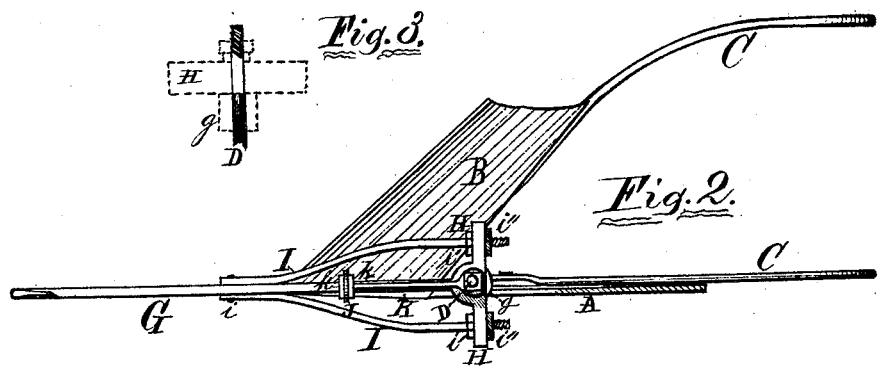
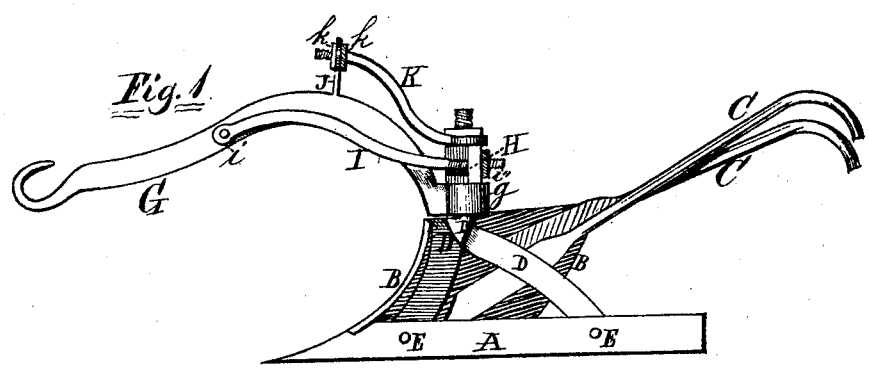
Witnesses:—
Platt R. Richards.
D. H. Clarke.
Inventor,
Walter Britton.
by W. T. B. Richards,
his atty.

UNITED STATES PATENT OFFICE.

WALTER BRITTON, OF TRURO, ASSIGNOR TO HIMSELF AND ELMWOOD MINING AND MANUFACTURING COMPANY, OF ELMWOOD, ILLINOIS.

IMPROVEMENT IN PLOWS.

Specification forming part of Letters Patent No. 113,733, dated April 18, 1871.

*To all whom it may concern:*

I, WALTER BRITTON, of Truro, in the county of Knox and State of Illinois, have invented certain Improvements in Plows, of which the following is a specification:

Nature and Objects of the Invention.

The nature of this invention relates to attaching metal beams to plows so that the horizontal and vertical vibration of the beam relative to the standard may be adjusted for the purpose of governing the depth of furrow and width of land, as desired; and the invention consists in pivoting the end of the beam, which is provided with a swivel-eye, loosely on the upper part of an extended standard. The vertical vibration of the beam is adjusted by a brace extending from the upper end of the standard to a lug on the upper side of the beam, and nuts and screws. The lateral vibration of the beam is adjusted by side braces extending from the central portion of the beam to a cross-bar on the extended standard, all as hereinafter fully described.

Description of the Accompanying Drawing.

Figure 1 is a side elevation of a plow with my invention. Fig. 2 is a top view of the same. Fig. 3 is a rear elevation of the extended part of the standard.

General Description.

A is the land-side, and B is the mold-board of an ordinary plow. C C are the handles. D is the standard, forked at the lower end and attached to the land-side A by bolts E E. The upper end of the standard D is extended above the mold-board, and a portion of its length made round and a portion square in their cross-section, as shown at Fig. 3, for purposes hereinafter described.

G is the beam, curved upward in its central portion, as shown at Fig. 1, and provided with a swivel-eye, $g$, at its rear end, which fits loosely over the round part of the extended standard, immediately above the mold-board, allowing free vibration of the beam laterally, and by its looseness on the standard somewhat vibration vertically. H is a cross-bar, fitted on the square part of the shank to prevent its turning, and immediately over the eye $g$. I I are adjustable braces, one on each side of the beam, their forward ends attached to the beam by bolt $i$, and their ends threaded and passing through holes in the ends of the cross-bar H, and provided with nuts $i'$ $i''$. J is lug projecting upward from the higher and central part of the beam G. K is a brace, its rear end pierced and passed over the upper and round portion of the standard D, and seated immediately above the cross-head H, its forward end passing through a hole in the projection J, and threaded and carrying a nut, $k$, on each side of said projection or lug J.

The operation is as follows: By running one of the nuts $i'$ $i''$ back and the other forward on their respective braces I I, the forward end of the beam G may be adjusted to the right or left to run the plow to or from the land, as desired; and by running the nuts $k$ $k$ forward or back on the brace K the forward end of the beam may be raised or lowered to run the plow deeper or more shallow, as desired.

In all the different adjustments both laterally and vertically of the beam the draft will always be from the same central point on the shank.

Claims.

I claim as my invention—

1. The braces I I, cross-bar H, and nuts $i'$ $i''$, when arranged to operate with the beam G and extended standard D, substantially as and for the purpose specified.

2. The brace K, lug J, and nuts $h$ $k$, when arranged to operate with the beam G and extended standard D, substantially as described, and for the purpose specified.

WALTER BRITTON.

Witnesses:
 LUCIUS O. WILSON,
 WM. DIFFENDORF.